United States Patent [19]
Rasovich

[11] 4,403,479
[45] Sep. 13, 1983

[54] QUICK FREEZING SYSTEM

[75] Inventor: Ivan Rasovich, 2653 E. Timberlake, La Crescenta, Calif. 91214

[73] Assignee: Ivan Rasovich, Pacomia, Calif.

[21] Appl. No.: 349,989

[22] Filed: Feb. 18, 1982

Related U.S. Application Data

[63] Continuation-in-part of Ser. No. 182,961, Sep. 2, 1981, abandoned.

[51] Int. Cl.³ .............................................. F25D 13/06
[52] U.S. Cl. ......................................... 62/63; 62/186; 62/374; 62/380
[58] Field of Search ...................... 62/63, 64, 186, 187, 62/374, 380

[56]    References Cited
U.S. PATENT DOCUMENTS 3,485,055 12/1969 Webster et al. .......................... 62/63
3,832,864  9/1974 Rasovich ................................ 62/374
3,898,863  8/1975 Wagner .................................. 62/374

Primary Examiner—Ronald C. Capossela
Attorney, Agent, or Firm—Harris, Kern, Wallen & Tinsley

[57] ABSTRACT

Apparatus for quick freezing of food products and the like including an insulating tank with a liquid nitrogen bath, an adjacent chamber, a conveyor system for moving product through the bath and the chamber, and an exhaust system for drawing vapor from the tank into and out of the chamber. A process for quick freezing of food products and the like wherein at least the surface of an item is frozen by immersing the item in a liquid nitrogen bath, after which the item is moved through a chamber and further cooled by vapor from the liquid bath drawn into the chamber.

13 Claims, 7 Drawing Figures

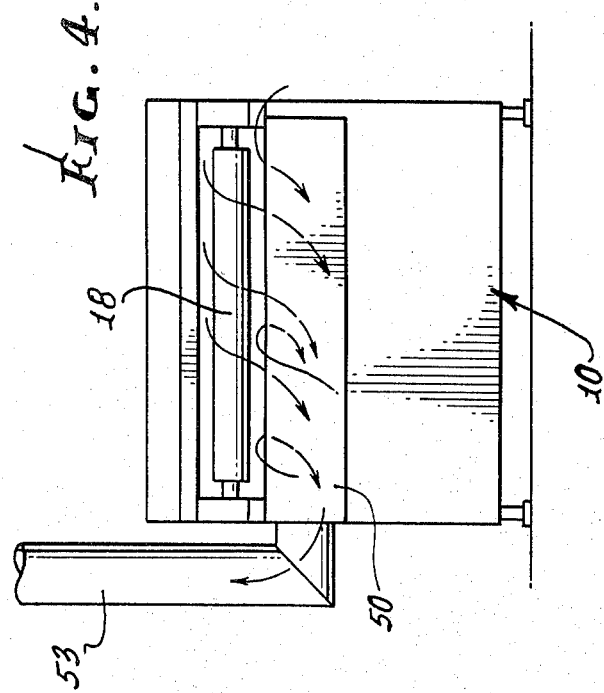
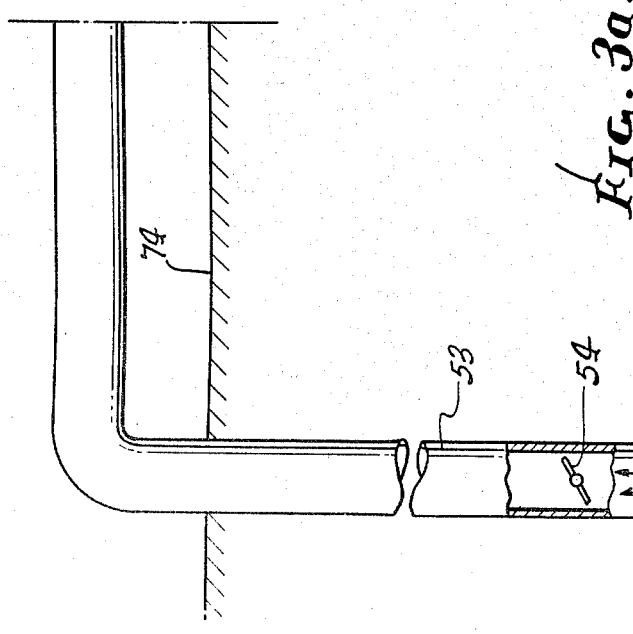
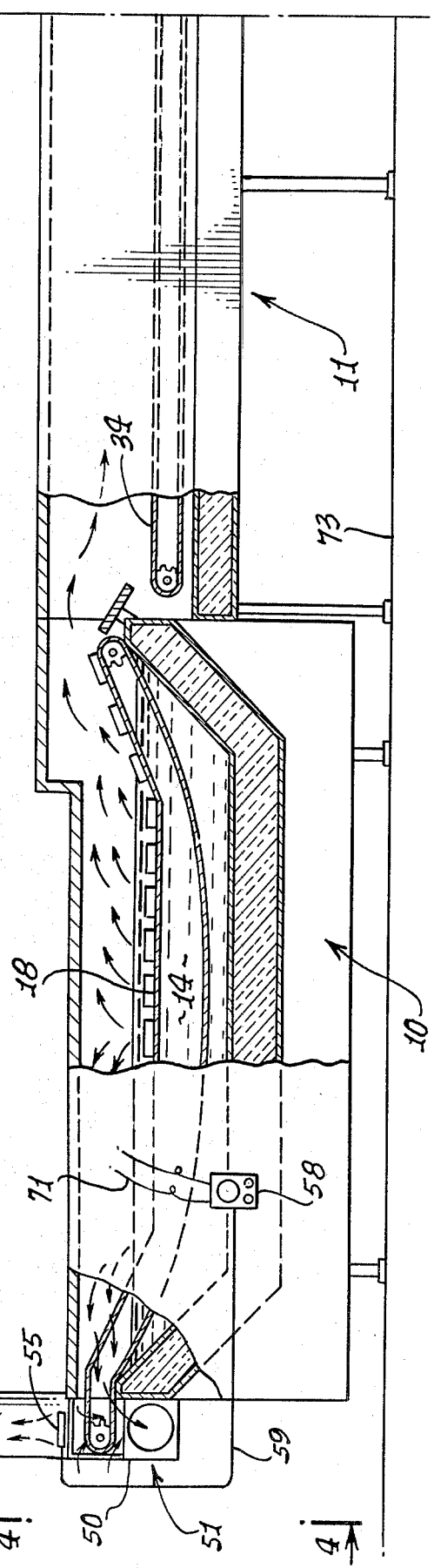

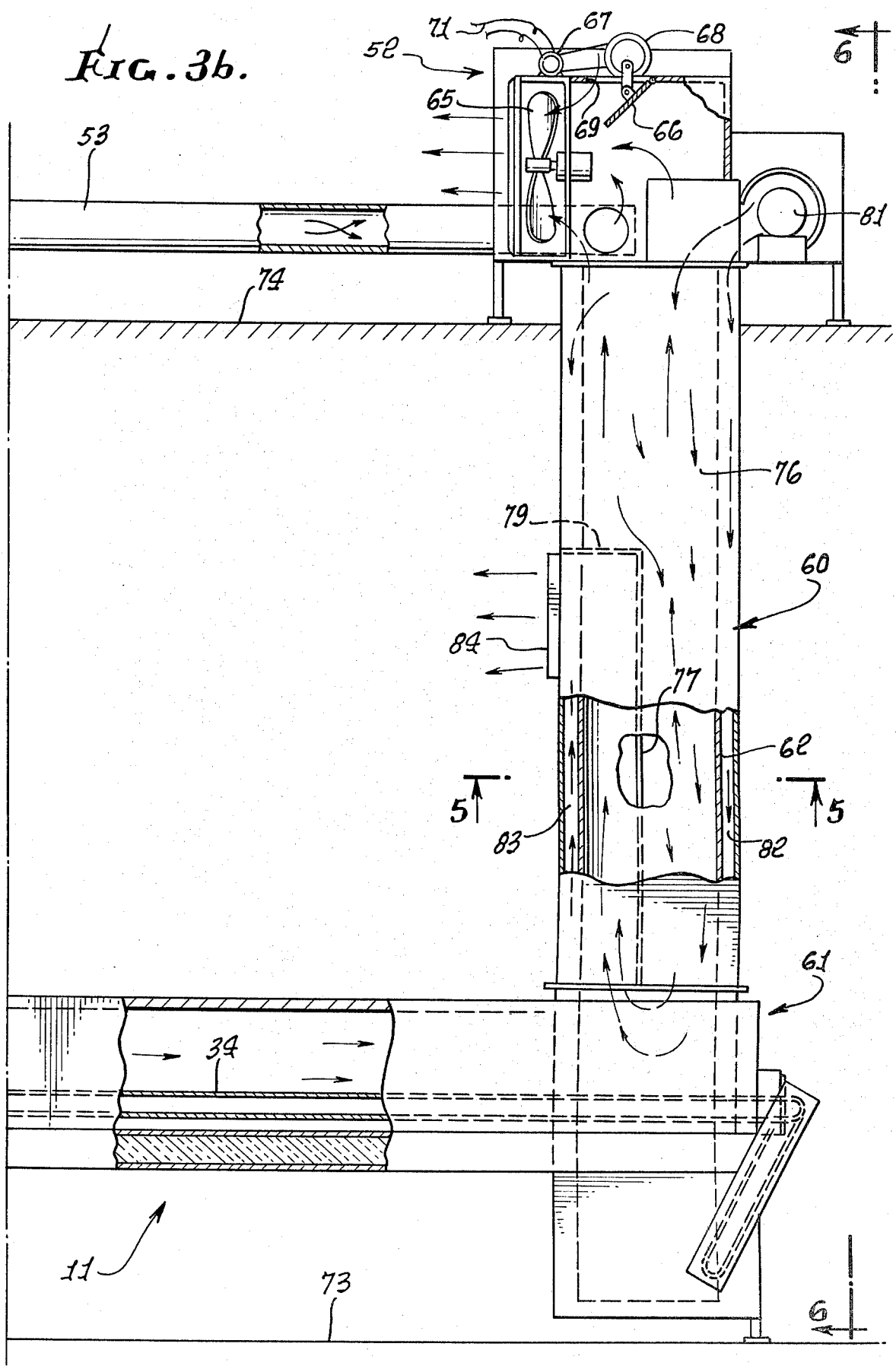

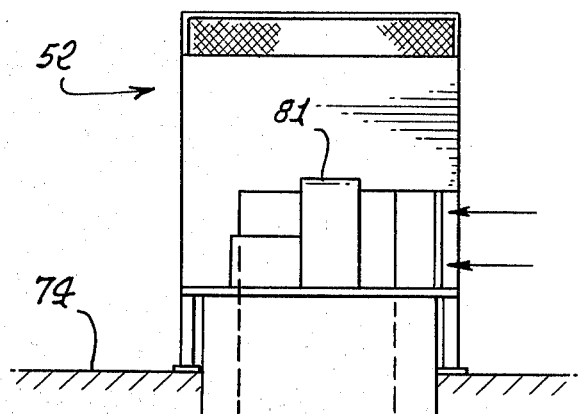
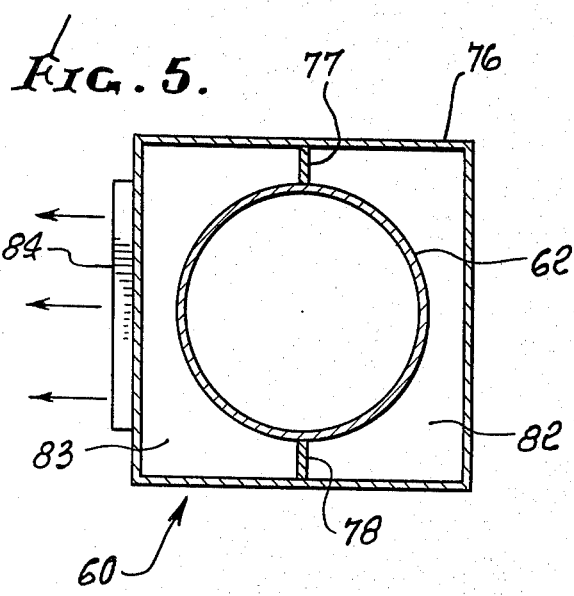
Fig. 5.
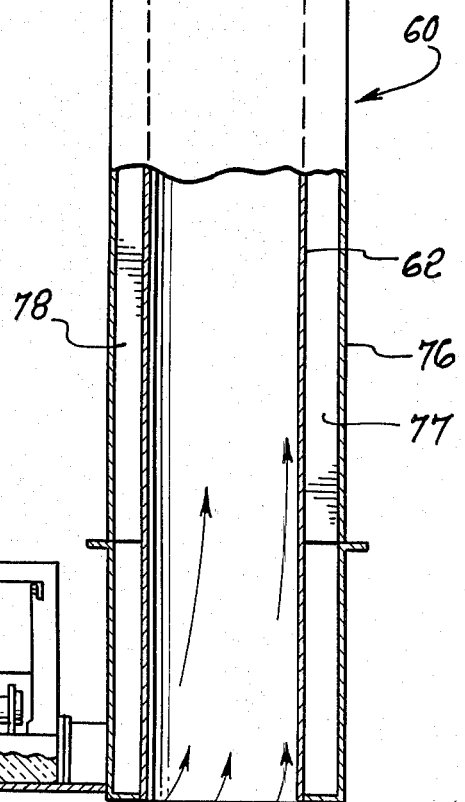
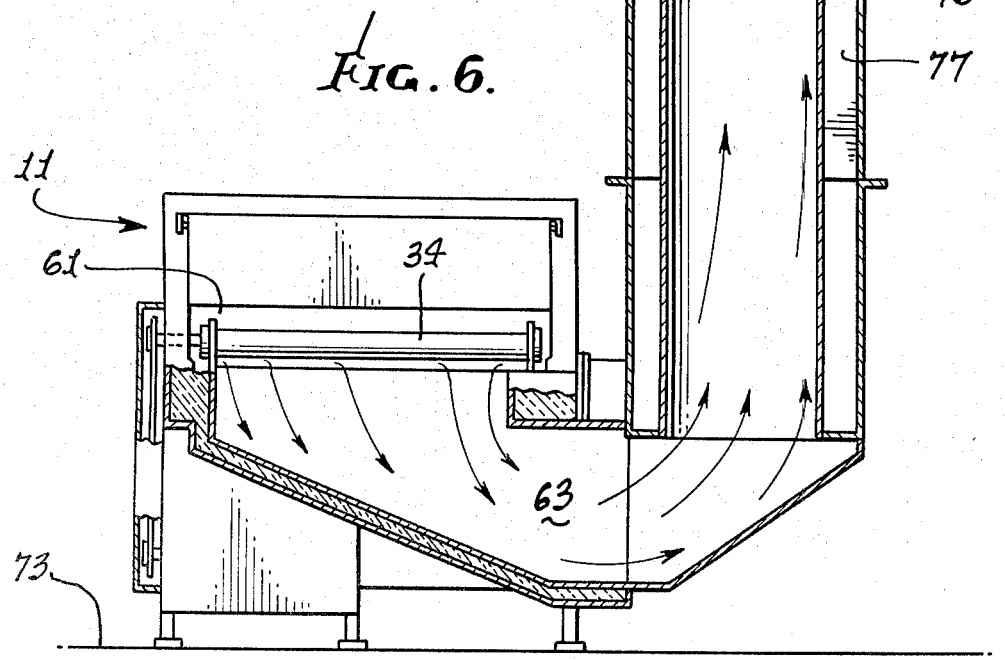
Fig. 6.

QUICK FREEZING SYSTEM

CROSS-REFERENCE TO RELATED APPLICATION

This application is a continuation-in-part of my copending application on Quick Freezing System, U.S. Ser. No. 182,961, filed Sept. 2, 1981, now abandoned.

BACKGROUND OF THE INVENTION

This invention relates to apparatus and method for the quick freezing of food products and the like and in particular to a new and improved apparatus and method which provides for freezing in shorter time and with greater efficiency. The specific embodiment of the invention described herein is particularly suited for use with packaged vegetables, packaged meat and whole fowl, but is equally suited for quick freezing of other items.

Liquid nitrogen is widely used for quick freezing of various products and two basic systems presently are in use. One system is called the "freezing tunnel" which utilizes an insulated enclosure with a conveyor belt or the like for moving product therethrough. Usually about three quarters of the way along the conveyor path, spray nozzles are installed for spraying liquid nitrogen onto the product. A substantial portion of the liquid nitrogen is transformed into nitrogen vapor at the spray nozzle. The remaining liquid nitrogen is quickly vaporized on contact with the product, producing cooling of the product. The vapor is circulated through the enclosure by fans for increasing the efficiency of heat transfer between the vapor and the product. Normally a thermostat provides a control of the amount of liquid sprayed into the enclosure for maintaining the temperature within predetermined limits. The product is frozen during its passage through the tunnel and emerges ready for storage and/or shipment in refrigerated equipment.

The freezing tunnel method under favorable conditions transfer approximately 120 BTU of cooling to the product, from a theoretically possible 160 BTU, thus operating at approximately 75% efficiency. A typical tunnel is in the order of 60 feet long and requires several minutes for the product to move through the tunnel. This relatively slow freezing, the large size of the tunnel and the relatively high cost of the system are disadvantages.

The other system for quick freezing currently in use is the so-called "liquid immersion system" utilizing a liquid bath in an insulated tank with some form of conveyor for moving the product through the bath. Freezing is accomplished by moving the product on the conveyor belt through the liquid nitrogen with the fully frozen product emerging at the downstream end. One such liquid immersion system is shown in my U.S. Pat. No. 3,832,864, and other liquid immersion systems are shown in the references cited in said patent. The liquid immersion system has several advantages over the freezing tunnel system including size, typically being about 9 feet long, faster freezing, taking several seconds rather than several minutes, and lower cost, costing about ⅓ that of a freezing tunnel for the same capacity. However the efficiency of the liquid immersion system is about the same as that of the freezing tunnel system.

A combination liquid immersion and freezing tunnel system is shown in U.S. Pat. No. 3,376,710. In the system shown in this patent, product is introduced for freezing by sliding it over an entrance ramp until it drops into a liquid nitrogen bath. The product is suppose to drop to the bottom of the bath and is moved along the bottom by fingers attached to a drive belt positioned above the surface of the liquid nitrogen. The nitrogen bath provides the first stage of cooling. The fingers of the belt push the product up a slope out of the bath for discharge onto a conveyor belt for the second, vapor cooling stage.

The second stage uses nitrogen vapor from the liquid bath. Six recirculating fans are located in the second stage housing above the conveyor belt. Rounded directional top and bottom baffles are provided for each fan for controlling gas flow. Nozzles are provided for introducing nitrogen vapor adjacent each of the fans. The purposes of the fans and baffles is to provide relatively high vapor velocity, in the order of 1500 to 3000 feet per minute.

The aforesaid system suffers from a number of disadvantages. Because of the extremely low temperature at the entrance of the first stage, there tends to be substantial frost build-up so that the product sticks and does not freely fall into the liquid bath. The high gas velocity in the tunnel section tends to make products airborne. Also, the amount of energy required to produce this high velocity produces heat within the tunnel, reducing the efficiency of the system. The liquid bath and the subsequent cooling conveyor are positioned in a single insulated chamber, with additional nitrogen being sprayed into the conveyor system. This means that the overall system operates at substantially the same temperature, which must be the lower temperature at the liquid bath, necessarily at $-320°$ F. in order to prevent boiling of the nitrogen. Maintaining such a large piece of equipment at such a low temperature would result in low efficiency and also damage to a number of food products which have a tendency to crack when exposed to such a low temperature for such a long period of time. Also, each of the fans produces a doughnut shaped or annulus high velocity zone, with very low velocities in the areas between the fans. This non-uniform flow pattern tends to produce inequalities in freezing of product at different locations along the conveyor belt.

Another U.S. Pat. No. 3,485,055, discloses product precooling with cold liquid nitrogen vapor on one horizontal conveyor belt, immersion in liquid nitrogen on another vertical belt, additional cooling by liquid nitrogen spray, and final postcooling on another horizontal belt. An additional belt is used to wrap around the vertical belt for the purpose of preventing the product from falling off the vertical conveyor. Major portions of the belts are out of the liquid bath. A total of four conveyors are used. The entire system is in a single chamber.

U.S. Pat. No. 3,413,818 discloses a system similar to that of U.S. Pat. No. 3,485,055, but it is even more complicated. Product precooling is done on a horizontal regular conveyor. Immersion freezing is accomplished by another conveyor with baskets or buckets. For postcooling, another conveyor with buckets is utilized. Vapor circulation is accomplished by means of blower, duct, air locks and dampers. This patent proposes to push the vapor through several buckets full of product. The vapor pressure required to do so would have be to so high that the product would become airborne. Also the postcooling bucket conveyor could not run substantially slower and with heavier loading than the immersion conveyor. The cold vapor used for postcooling would pass around the buckets rather than contact all the product.

It is an object of the present invention to provide a new and improved quick freezing method and apparatus which can be operated with improved efficiency while at the same time holding down size and cost.

It is a further object of the present invention to provide a method and apparatus for preventing frost build-up at the inlet of the system, and in particular, to provide for withdrawal of a small quantity of nitrogen vapor at the inlet and mixing with outside air.

It is an additional object of the present invention to provide a new and improved method and apparatus which eliminates any need for recirculating fans and/or nitrogen spray in the second stage cooling tunnel. A particular object is to provide such a system incorporating an external exhaust for drawing nitrogen through the cooling tunnel and for providing control of the rate of flow of nitrogen vapor in the cooling tunnel for maintaining a desired temperature. An additional object is to provide a system wherein a relatively low uniform gas velocity is maintained in the cooling tunnel, and incorporating baffles for producing gas flow across the product as the product moves through the tunnel.

It is a particular object to provide a new and improved quick freezing method and apparatus with the liquid immersion system thermally insulated separate from the cooling tunnel so that the two components of the overall system can be maintained at different temperatures and also so that the conveyor speed of product through the liquid bath and through the cooling or freezing tunnel can be different. More particularly, it is an object to provide a system wherein there is a relatively low but substantially uniform vapor velocity through the freezing tunnel, with the product speed through the tunnel being reduced in order to extend the product exposure time, thereby increasing operating efficiency and improving product freezing.

An additional object of the invention is to provide such a method and apparatus wherein the exhaust magnitude is automatically varied to provide the desired temperature operation with variations in loading, such as the number, size and/or inlet temperature of product being frozen.

A further object of this invention is to provide method and apparatus wherein the exhaust nitrogen vapor may be utilized for reducing the temperature of the room in which the freezing system is operated and for creating a slight positive pressure in the room thereby reducing the likelihood of contamination by dust, insects and the like.

Other objects, advantages, features and results will more fully appear in the course of the following description.

SUMMARY OF THE INVENTION

The apparatus of the invention includes an insulated tank containing a liquid bath for quickly freezing items immersed therein, a separate insulated chamber having an inlet and an outlet with the inlet adjacent the tank, a conveyor system for moving a product into and out of the liquid bath and through the chamber from the inlet to the outlet, and an exhaust system coupled to the chamber for drawing vapor from the tank into the chamber and removing vapor from the chamber. In the preferred embodiment, the insulated chamber is an elongate tunnel having its inlet directly coupled to the outlet of the enclosure about the tank, with the exhaust system adjacent the outlet of the tunnel for drawing the cryogenic vapor through the tunnel, and including baffles in the tunnel for directing the vapor up and down past the product as it moves through the tunnel.

The process of the invention includes the steps of freezing at least the surface of an item by immersing the item in a liquid bath, then moving the item from the bath into and out of a chamber, and drawing vapor from the liquid bath into the chamber for further cooling of the item as it passes through the chamber.

The tank is preferably substantially enclosed so that substantially all vapor from the liquid in the tank is drawn into the chamber for use in further cooling of the product rather than being wasted. Also, it is preferred to utilize a faster conveyor for moving product through the tank and a slower conveyor for moving product through the chamber, permitting product to be stacked or piled one on another in the chamber permitting complete freezing to be obtained with a relatively short chamber.

The product leaving the freezing bath is very cold on the surface, but warmer in the center. Moving the product through the chamber also provides temperature equalization through the product, a desired characteristic in some freezing operations.

Provision is made for spilling a small quantity of the vapor from the inlet to prevent entry of outside air. This spilled vapor and some air are mixed and drawn away, the temperature of the mixture is sensed and used to control the exhaust through the cooling tunnel. The tunnel is operated without recirculating fans and without vapor spray inlets.

BRIEF DESCRIPTION OF THE DRAWINGS

FIGS. 3a and 3b are a side view of an alternative embodiment of a quick freezing system, partially in section, illustrating the presently preferred embodiment of the invention;

FIG. 4 is an end view of the system of FIG. 3 taken along the line 4—4 of FIG. 3a;

FIG. 5 is a sectional view taken along the line 5—5 of FIG. 3b; and

FIG. 6 is an end view of the system of FIG. 3 taken along the line 6—6 of FIG. 3b.

DESCRIPTION OF THE PREFERRED EMBODIMENTS

Figure 1:
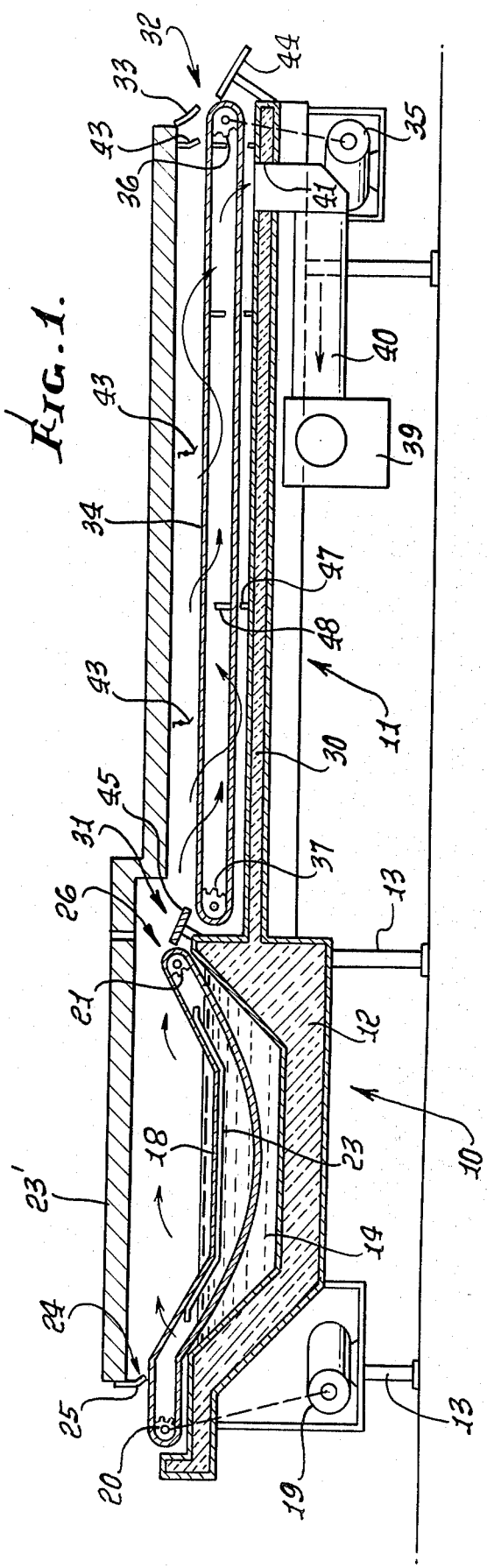
FIG. 1 is a side view of a quick freezing system, partially in section, illustrating one embodiment of the invention.
Figure 2:
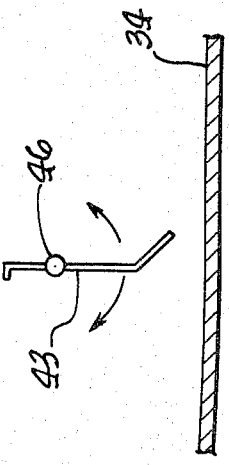
FIG. 2 is an enlarged view of a portion of FIG. 1 showing a baffle detail.

The system as illustrated in FIGS. 1 and 2 includes a cryogenic liquid immersion freezer 10 and a cryogenic vapor chamber 11. Various forms of liquid immersion freezers may be utilized and the presently preferred embodiment is that illustrated in U.S. Pat. No. 3,832,864, and reference may be made thereto for details of construction and operation. In general, the freezer includes an insulated tank 12 supported on legs 13 and containing a cryogenic liquid 14, typically nitrogen. A conveyor belt 18 provides for moving product through the liquid and is driven by drive motor 19 and drive sprockets 20, 21. Product moves from left to right through the tank, with the upper section of the belt 18 resting on a guide 23.

In the preferred embodiment, the tank is covered with an insulating enclosure 23 having an inlet opening 24 typically covered by a curtain 25, and an outlet opening 26, so as to prevent loss of cryogenic vapor rising from the cryogenic liquid.

The chamber 11 provides a holding period for the product from the freezer 10 during which time vapor from the freezer is moved through the chamber providing further cooling of the product. The chamber may take various configurations and the prior freezing tunnel configuration is presently preferred, with the liquid nitrogen spray nozzles and circulating fans omitted. Typically the chamber includes an insulated shell 30 with an inlet 31 directly coupled to the freezer outlet 26, and with an outlet 32, also closed by a curtain 33. The product is moved through the chamber from the inlet to the outlet, preferably on a conveyor belt 34 powered by a drive motor 35 and drive sprockets 36, 37.

The chamber 11 preferably is thermally separated from the freezer 10, with communication limited to the zone at the freezer outlet 26 and the chamber inlet 31, so that the two components may be operated at different temperatures. This permits maintaining the freezer at −320° F. or below, the boiling temperature of nitrogen, while the chamber may be in the range of about 180° F. at the inlet to about −20° F. at the outlet, with a marked improvement in efficiency of operation.

An exhaust system is attached to the chamber and typically includes an exhaust fan 39 coupled through a duct 40 to an exhaust opening 41 in the chamber adjacent the outlet 32. Transverse baffles 43 may be mounted in the chamber above the belt 34, transverse baffles 47 may be mounted below the belt, and transverse baffles 48 may be mounted between the upper and lower sections of the belt. These baffles serve to divide the tunnel into temperature zones and to direct the vapor downward and upward over the product. The baffles 43 preferably extend downward to the upper surface of the belt and are pivoted at 46 to permit product on the belt to pass the baffle. The exhaust system preferably is positioned below the chamber, with the exhaust opening 41 in the bottom of the chamber. With this configuration the cold vapor falls into the duct 40, rather than having to be raised to the top of the chamber by the conventional exhaust fan placed on top of the chamber, resulting in a further improvement in operating efficiency.

Means are provided for transferring product from the freezer 10 to the chamber 11 and this typically may be accomplished by positioning the downstream end of the conveyor belt 18 above the upstream end of the conveyor belt 34, with a slide plate 43 disposed therebetween, so that product slide down from the belt 18 onto the belt 34. Another slide plate 44 may be positioned at the downstream end of the belt 34 for guiding the frozen product to a stacking machine or another conveyor belt or otherwise as desired. Desirably the chamber or at least the belt, slopes upwardly from the inlet to the outlet at about 5 degrees, as in prior art tunnels.

In operation, the items to be frozen are placed in sequence on the upstream end of the belt 18, preferably spaced from each other so that the entire surface of the item may contact the liquid nitrogen during immersion. At least the surface of the product is frozen during immersion in the liquid nitrogen, the depth of freezing depending upon the initial temperature of the product, the size of the product, and the duration of immersion. The product is then deposited on the conveyor belt 34 and moves through the chamber 11, with additional cooling being achieved by means of the cryogenic vapor drawn from above the tank into the chamber and through the chamber by the exhaust system. The travel time of the product through the chamber is selected so that the product is frozen through before leaving chamber.

Preferably, the chamber conveyor is operated at a slower rate than the freezer conveyor permitting the chamber to be shortened while achieving the desired residence time for the product in the chamber. With this mode of operation, the items which are spaced from one another on the freezer conveyor belt may overlap or be stacked on the chamber conveyor belt. Typically several layers of items may be piled on the belt 34 permitting a substantially shorter chamber than would be utilized for a conventional freezing tunnel. By way of example, compared with a freezing tunnel system requiring a chamber 60 feet long, the system of the invention may obtain the same results with a chamber 20 feet in length.

An immersion freezer operating at about 75% efficiency, as previously discussed, produces large quantities of still very cold nitrogen vapor which normally is exhausted and thereby lost. In the present invention, this nitrogen vapor is drawn into the adjacent chamber and circulated about the product. The cold vapor typically enters the tunnel at about −150° to −200° F. While passing through the chamber 11, the vapor picked up heat from the product and when exhausted is at a temperature of about 0° to −20° F. Thus the overall efficiency of the combination of freezer and chamber is improved by about 15 to 20% with the resultant total efficiency of the system of 90 to 95%.

Heat transfer of the product while passing through the chamber 11 is enhanced in the system of the present invention because heat transfer through the frozen surface of the product is approximately twice that through the non-frozen product. This is one of the operating features which permits making the chamber substantially shorter. Also, the spray nozzles and associated temperature controller and the fans of the conventional freezing tunnel are omitted. A typical immersion freezer for use with the 20 foot chamber previously mentioned is about 9 feet in length, resulting in an overall system requiring only about half the space of a corresponding prior art system.

An alternative embodiment of the quick freezing system is shown in FIGS. 3-6, wherein the immersion freezer 10 and the vapor chamber 11 are substantially the same as in the embodiment of FIGS. 1 and 2. A trough 50 is provided at the inlet end 51 of the freezer 10, and the trough 50 is connected to an exhaust unit 52 by a duct 53. A flow control mechanism is provided in the duct 53, and typically is a manually adjustable butterfly valve 54. A temperature sensing element 55 is also provided in the duct 53 adjacent the duct inlet, for sensing the temperature of the vapor moving through the duct. The temperature sensor 55 is connected to a temperature controller unit 58 by a line 59.

An exhaust duct 60 is provided at the outlet end 61 of the vapor chamber 11. An inner circular duct 62 provides for vapor flow from the outlet end 61 of the chamber 11, downward and laterally through section 63, and upward to the exhaust unit 52. An exhaust fan 65 is mounted in the exhaust unit 52 and draws vapor to the exhaust unit through the duct 53 and the duct 62. Means are provided for controlling the rate of exhaust of vapor. In the embodiment illustrated, the fan 65 runs at substantially constant velocity. A hinged door 66 is positioned by a motor 67 and gear unit 68 to vary the size of the opening of a port 69 in the exhaust unit for admitting outside air into the exhaust unit. The motor 67 is controlled by the temperature controller unit 58, with these components interconnected by wires 71. Opening the port 69 and admitting more air into the exhaust unit 52 reduces the amount of vapor being exhausted, while reducing the size of the opening of the port increases the amount of vapor being exhausted.

In the embodiment illustrated in FIGS. 3-6, the freezer 10 and chamber 11 are mounted in a room, with the floor 73 and ceiling 74 shown. The exhaust unit 52 is mounted above the ceiling, with the ducts 53 and 60 passing the ceiling.

The exhaust duct 60 may also include a second set of passages which are positioned around the inner circular duct 62. A square outer duct 76 is positioned around the circular inner duct 62. Vertical baffles 77, 78 are positioned between the inner duct 62 and outer duct 76, and extend from a lower position adjacent the chamber 11 to an upper position defined by a horizontal baffle 79. A blower or fan 81 moves outside air downward in the duct 76 around the duct 62 and through the passage 82, around the lower ends of the baffles 77, 78, upward in the passage 83 and out the opening 84 into the room in which the freezer 10 and chamber 11 are located.

In operation, product to be frozen is placed on the belt 18 of the freezer 10 at the inlet 51. Cold nitrogen vapor is produced in the freezer by immersion of the warm product into the liquid nitrogen 14. A small quantity of the nitrogen vapor spills out of the freezer at the inlet into the trough 50. This spilled over vapor mixes with room air in the trough with the resultant mixture having a temperature in the order of −100° F. The major portion of the nitrogen vapor is drawn through the chamber 11, upward through the duct 62 and is exhausted by the fan 65.

The cold nitrogen vapor moves through the chamber 11 and is forced by the baffles to move up and down several times through the belt 34 which carries the product, as best seen in FIG. 1. The vapor ultimately falls into the collector 63 at the outlet end 61. In order to obtain maximum efficiency of the freezing system, it is desirable that all nitrogen vapor be exhausted, but that no fresh room air be allowed to enter the system. When room air enters, heat and moisture coming with it results in greater vaporization of nitrogen and loading of the system with snow and ice. With the system illustrated, entry of warm air is prohibited by permitting a small quantity of nitrogen vapor to exit from the freezer at the inlet end. Typically about 5% of the vapor produced in the freezer leaves at the inlet and 95% moves through the chamber. The amount of nitrogen vapor moving from the freezer at the inlet into the trough 50 and the duct 53 may be controlled by adjusting the valve 54 and by adjusting the hinged door 66. It has been determined that the desired flow control can be achieved by sensing the temperature of the air-nitrogen vapor mixture at the inlet end of the duct 53, and controlling the exhaust fan operation as a function of this sensed temperature. When the sensed temperature goes down, indicating an increased amount of nitrogen vapor in the mixture, the size of the opening at the port 69 is reduced to increase the suction through the chamber. Conversely, when the temperature of the mixture goes up, the size of the opening at the port is increased to reduce the suction through the chamber and permit more nitrogen vapor to mix with the air at the freezer inlet.

The blower 81 circulates outside air about the exhaust duct 62 which carries the nitrogen vapor to the exhaust unit 52. This serves to cool the outside air before it is discharged into the room. At the same time, the exhaust nitrogen vapor which leaves the chamber typically in the range of 0° to −40° F., is warmed before it reaches the exhaust fan above the ceiling.

Under normal operation, the exhaust system of the freezing system picks up some room air in addition to the cold nitrogen vapor. This creates a slight vacuum within the processing room, which is undesirable as it tends to cause entry of dust and flies into the room. Also, the freezing rooms usually are operated at refrigerated temperatures, typically in the range of 35° to 50° F. The use of the blower 81 and associated ducting for introducing outside air into the workroom creates a slight positive pressure in the room, countering the tendency to have a slight vacuum in the room. Also, the cooling of the outside air by the exhaust nitrogen vapor aids in refrigerating the workroom and reduces the overall cost of operation. In addition, the double ducting at the exhaust eliminates the formation of frost on the nitrogen vapor exhaust, and the associated melting and dripping water problems. Another advantage of the double exhaust system is the improved efficiency of operation and operating life of the exhaust fan 65 by having it operate at a higher temperature, usually above the freezing point, than would be available if cold nitrogen vapor was exhausted from the chamber without the intermediate heat exchange with outside air.

One of the major problems in the design of the spray system for the conventional freezing tunnel is controlling the feed of liquid nitrogen to the spray nozzles. Temperature controllers normally provide control of the flow of liquid nitrogen as a function of measured temperature within the tunnel. However change in loading of product on the belt, which frequently occurs, does not immediately produce change in temperature within the chamber and hence the liquid nitrogen control does not respond resulting in waste of nitrogen. The system of the present invention inherently controls nitrogen consumption as a function of product feed. Product in the freezer 10 causes vaporization of the liquid nitrogen. Increase in the amount of product passing through the system produces an increase in nitrogen vapor, which increased amount of nitrogen vapor is required in the chamber 11 for completing the freezing of the product. Hence an increase in rate of flow of product automatically increases the amount of nitrogen vapor, and a corresponding decrease in rate of flow of product results in a corresponding decrease in the amount of nitrogen vapor produced. For the proper operation of the overall system it is only necessary to set the speeds of the two conveyors, which normally is determined by trial and error. The liquid nitrogen level in the tank is maintained automatically from a nitrogen supply. Once the appropriate speeds have been determined, very little supervision or adjustment is needed.

It is widely recognized that the faster the freezing of a product, the better the quality of the product on thawing. Fast freezing is achieved with the conventional liquid freezer unit, but at the expense of high consumption of liquid nitrogen. Normally the spray type freezing tunnel requires several minutes to freeze product where as an immersion freezer takes several seconds. By way of example, freezing of hamburger patties takes three minutes in a freezing tunnel and about 12 seconds in an immersion freezer. The desired fast freezing is achieved with the system of the present invention. Also, the product shrinkage or weight loss resulting from dehydration in the conventional tunnel freezer is avoided by using the immersion freezer.

In the embodiment illustrated in the drawing, the conveyor belt in the immersion freezer remains substantially constant at a temperature near −320° F. The conveyor belt in the chamber operates at a much higher temperature, about −180° F. at the inlet end and −20° F. at the outlet end. If only a single conveyor belt was utilized throughout the apparatus, the belt temperature would fluctuate between −320° and −20° F. requiring substantial additional amounts of liquid nitrogen just for cooling the belt. The use of two separate belts in two separate enclosures improves the efficiency of operation of the system.

Another advantage of the present system over the earlier freezing tunnel units is in reduced clean up requirements. The conventional freezing tunnel ordinarily is allowed to warm up at the end of the operating day and therefore has to be thoroughly washed to prevent growth of bacteria.

With the system of the present invention, there is liquid nitrogen remaining in the tank at the end of the operating day, which liquid will continue vaporizing even though no product is being introduced, and the resultant vapor will maintain the interior temperature of the entire apparatus well below freezing throughout the night so that washing every day is not required and so that precooling at start-up is not required.

I claim:

1. In a quick freezing system for food products and the like, the combination of:
   an insulated tank containing a cryogenic liquid bath for quickly freezing items therein and having means defining an enclosed space over said tank with an inlet and an outlet;
   an inlet receptacle at said tank inlet positioned for receiving cryogenic vapor from said tank, said receptacle including means for receiving atmosphereic air for mixing with the cryogenic vapor to form a gas mixture;
   first duct means for withdrawing said gas mixture from said receptacle;
   a temperature sensor for sensing the temperature of said gas mixture and providing a temperature signal;
   an elongate, horizontally disposed insulated chamber having an inlet and an outlet, with said tank outlet positioned at said chamber inlet providing a vapor flow path in the zone between said tank and chamber;
   a first conveyor belt in said tank for moving a product from said tank inlet to said tank outlet into and out of said liquid bath along a generally horizontal path;
   a second conveyor belt in said chamber for moving a product through said chamber from said chamber inlet to said chamber outlet along a generally horizontal path with said tank outlet and chamber inlet disposed for transfer of product through said zone from said first conveyor belt to said second conveyor belt;
   exhaust means coupled to said chamber adjacent said chamber outlet for drawing vapor from said tank through said zone and through said chamber and removing vapor from said chamber,
   said exhaust means including second duct means between said chamber and the atmosphere and control means for controlling the flow through said second duct means as a function of said temperature signal; and
   means connecting said temperature signal from said temperature sensor to said control means.

2. A quick freezing system as defined in claim 1 wherein the interior of said tank is separate from the interior of said chamber with the only outlet for vapor and liquid to said chamber being at said zone between said tank outlet and chamber inlet.

3. A quick freezing system as defined in claim 2 wherein the only outlet for vapor and liquid from said chamber is through said second duct means with said exhaust means providing the only means for moving vapor through said chamber.

4. A quick freezing system as defined in claim 1 wherein said second duct means includes an inner conduit, and an outer conduit about said inner conduit, and
   said exhaust means includes a first blower, with said inner conduit connecting said chamber to said first blower for moving cryogenic vapor from said chamber, and
   a second blower positioned for moving outside air through said outer conduit.

5. A quick freezing system as defined in claim 4 wherein said exhaust means further includes a second chamber between said inner conduit and first blower,
   means defining a variable opening in said second chamber to the outside air, and
   means for varying said opening as a function of said temperature signal to vary the amount of outside air moved by said first blower and thereby the amount of cryogenic vapor moved through said one chamber.

6. A quick freezing system as defined in claim 5 wherein said tank and one chamber are disposed within a room,
   with said inner conduit and first blower exhausting cryogenic vapor to the atmosphere outside said room, and
   with said outer conduit and second blower transporting air into said room from outside said room.

7. A quick freezing system as defined in claim 6 including baffles in said second conduit providing for air flow downward from the upper end to the lower end and then upward part way, with an outlet from said second conduit at said part way location.

8. In a process for quick freezing of food products and the like, the steps of:
   freezing at least the surface of an item by immersing the item in a cryogenic liquid bath while moving the item in a first generally horizontal path;
   moving the item from the liquid bath into and out of a chamber along a second generally horizontal path, including transferring the item from the first path to the second path;
   drawing vapor from the liquid bath adjacent the location where the item is initially immersed and mixing air with the vapor to provide an air-vapor mixture;
   sensing the temperature of the air-vapor mixture to provide a temperature signal;

drawing vapor from the liquid bath into and through the chamber for further cooling of the item as it passes through the chamber; and varying the rate of flow of vapor through the chamber as a function of the temperature signal.

9. A process as defined in claim 8 including maintaining the chamber separate from the bath with the temperature of the bath substantially lower than the temperature of the chamber.

10. A process as defined in claim 9 including drawing a major amount of the vapor from the bath through the chamber and drawing a minor amount of the vapor from the bath for mixing with air to produce the air-vapor mixture.

11. A process as defined in claim 9 including drawing about 95 percent of the vapor from the bath through the chamber and drawing about 5 percent of the vapor from the bath for mixing with air to produce the air-vapor mixture.

12. A process as defined in claim 8 including drawing vapor from the liquid bath through the chamber only through a zone interconnecting the bath and chamber, without addition of other cryogenic liquid or vapor to the chamber, and without operation of any vapor circulating mechanisms in the chamber.

13. A process as defined in claim 8 using the vapor drawn from the chamber as a cooling medium for outside air introduced into the room in which the process is being performed.

* * * * *